June 8, 1926.

J. H. MATTHEWS

MILEAGE INDICATOR

Filed Dec. 31, 1923

1,588,254

Inventor
Jesse H. Matthews
by Orwig & Hague Attys.

Patented June 8, 1926.

1,588,254

UNITED STATES PATENT OFFICE.

JESSE H. MATTHEWS, OF DES MOINES, IOWA.

MILEAGE INDICATOR.

Application filed December 31, 1923. Serial No. 683,716.

The object of my invention is to provide an indicating device of simple, durable and inexpensive construction which is adapted to be applied to the cowl board or dash of an automobile, by means of which any reading of the automobile odometer may be registered to act as a reminder to the driver of the automobile that some attention is to be given to the renewal of oil or the like.

More specifically it is the object of my invention to provide an indicating mechanism which may be easily and quickly actuated and which may be placed in the dash of an automobile where it may be conveniently observed by the operator for the purpose above stated.

Another object is to provide in an indicator having a series of numeral bearing wheels so arranged that when set in a certain position they will indicate the number of miles the automobile has been operated, improved means for actuating certain ones of the numeral bearing wheels independently of the others for the purpose of permitting the device to be quickly adjusted.

My invention consists in the construction, arrangement and combination of the various parts of the device, whereby the objects contemplated are attained, as hereinafter more fully set forth, pointed out in my claims, and illustrated in the accompanying drawings, in which:

Figure 2:
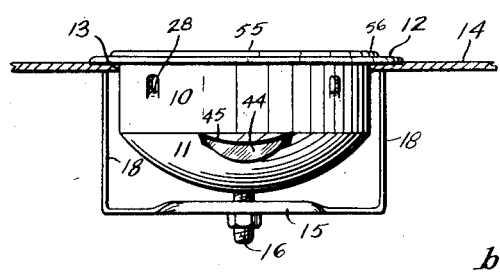
Figure 2 is a side elevation of the same showing it mounted in a dash of an automobile, said dash being shown in section.

My improved device comprises a cylindrical casing 10 having a spherical shaped bottom 11 and its upper edge provided with an outwardly extending annular flange 12. The casing is designed to be mounted in a circular opening 13 of a dash 14, with the flange 12 resting against the face of the dash. The casing is secured in position by means of a U-shaped frame 15, and a bolt 16 extending through the opening 17 in the bottom member 11. Legs 18 of the member 15 rest against the inner face of the dash, as clearly shown in Figure 2. This provides means whereby the device may be easily and quickly attached to the dash by simply drilling a circular hole, then inserting the body portion 10 and then applying the member 15.

The indicator mechanism is mounted in a rectangular frame 19 having side members 20 and 21 and end members 22 and 23. The upper edge of the frame 19 at each corner is provided with a notch 24. The end member 23 is provided with an opening 25 and the end member 22 with an opening 26 in alinement with and somewhat larger than the opening 25. Each of the said end members is provided with an opening 27, said openings being in alinement with each other. The frame 19 is preferably formed square with sides and end members of such length that the corners of the frame will set snugly within the cylindrical shell 10 with the lower edge of the frame resting on the bottom 11 at its intersection with the shell 10. Four lugs 28 are formed in the shell 10 and bent inwardly to rest in the notches 24. This provides means whereby the frame 19 may be rigidly supported within the shell.

Before the frame is placed within the shell, the registering mechanism is assembled and carried by the said frame, which consists of a shaft 29 having a longitudinally extending groove 30, the shaft being of a length somewhat greater than the width of the frame 19, but less than the diameter of the inside of the shell 10, and is designed to be mounted in the openings 25 and 26 and to receive a series of numeral bearing wheels 31, 32, 33, 34 and 35, each of which has its periphery provided with characters to represent the nine digits, indicated by the numeral 36.

Figure 4:
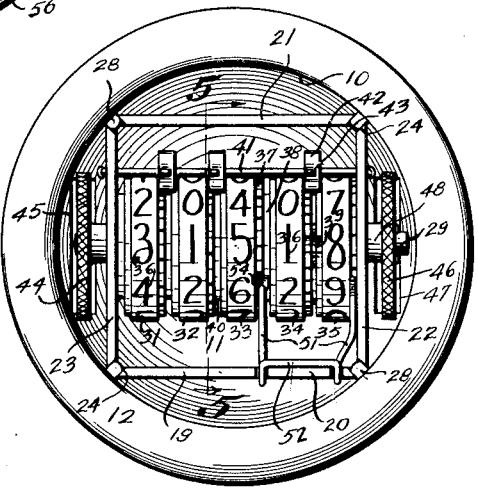
Figure 4 is an enlarged front view showing the crystal and crystal plate removed.

Each of the numeral wheels has one of its faces provided with gear teeth 37 and its opposite face provided with an annular shoulder 38 having a notch 39. The said face is also provided with a centrally located hub 40. The openings 27 are designed to carry a shaft 41 in which is mounted a series of carrying wheels 42, said wheels consist of simply small pinions having the face of one tooth shorter than the rest, which is indicated by the numeral 43, in such a manner that the right hand end of the pinion 42, as shown in Figure 4, will form an intermittent gear, while the left hand end forms a pinion which is in continuous mesh with the gear teeth 37. The pinions 42 and the gear are so arranged that when the right hand numeral wheel has made a single revolution, the adjacent left hand wheel will be advanced a distance equal to the space of one of the digits, or one-tenth of a revolution. This carrying mechanism, however, is the same as in common use and forms no part of my present invention.

Referring to Figure 4, it will be seen that I have placed one of the carrying devices between the numeral wheels 34 and 35, one between the wheels 32 and 33 and one between the wheels 31 and 32, leaving the space between the wheels 33 and 34 without any carrying mechanism, which substantially separates the wheels 34 and 35 from the other wheels. One end of the shaft 29 is provided with a knurled wheel 44 rigidly secured thereto, and has its edge extending through a slot 45 in the bottom member 11, and the opposite end of the shaft 29 is provided with a knurled wheel 46 extending through a slot 47 in the bottom member 11. The wheel 46 is rotatively mounted on the shaft and is provided with a hub 48 rotatively mounted in the opening 26. The hub 48 is formed with a somewhat contracted portion 49 designed to carry the numeral wheel 35, said wheel being rigidly secured thereto.

Thus it will be seen that the wheel 35 may be rotated by rotating the wheel 46, said wheel 46 being rotated by the operator engaging the outwardly extending portion of its periphery with his first finger. When the wheel 35 has been rotated through one revolution, the wheel 34 will then be moved one space by the carrying wheel 42. The numeral bearing wheel 33 is rigidly secured to the shaft 29 by having an inwardly extending projection 50 to rest in the groove 30.

By this arrangement it will be seen that by rotating the wheel 44, the numeral wheel 33 will be rotated therewith, the wheel 33 representing the hundredths position.

This device is particularly designed for tallying or registering the number of miles that an automobile has traveled since the time the oil was changed. It is generally the practice to change the oil at an even number of hundred miles. It will be seen that if the factory advises the changing of oil every five hundred miles, in order to set the register, all the operator has to do is to move the wheel 44 through five-tenths of a revolution, and five hundred miles has immediately been placed on the register. The mileage of tens and units may be taken care of by the wheel 46, which in practice is only operated to make the reading of the register agree with that of the speedometer.

Figure 1:
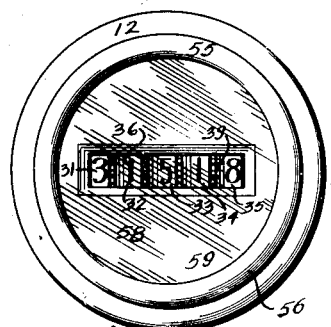
Figure 1 is a front view of my improved register completely assembled.
Figure 5:
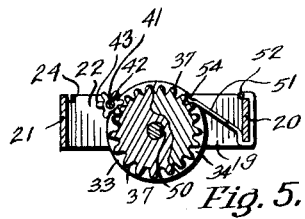
Figure 5 is a detail sectional view taken on the line 5—5 of Figure 4.
Figure 6:
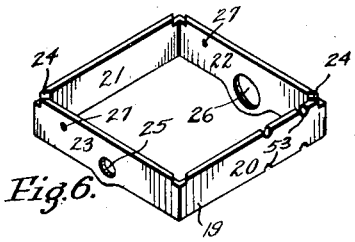
Figure 6 is a detail perspective view of the frame for supporting the registering mechanism.

The numeral wheels 31 and 32 are actuated through the carrying pinions 42. The said pinions 42 serve to hold the wheels 31, 32 and 34 against rotation, except when actuated by the wheels 33 and 35. The wheels 33 and 35 are held against accidental rotation by means of spring pawls 51 formed of a single piece of spring wire and are substantially U-shaped. The two members are connected by a cross member 52. The spring is designed to rest in notches 53 in the upper and lower edges of the frame side members 20, as clearly illustrated in Figure 5.

The device is placed in position by first placing the member 51 inside of the top edge of the member 20 and then swinging the members 51 under the lower edge of said member 20 and upwardly and outwardly, causing the inner ends of the members 51 to engage the notches in the bottom edge of the frame 20. This is accomplished before the numeral bearing wheels are placed in position. The free ends of the members 51 are then permitted to engage the gear teeth of the wheels 33 and 35, the said free ends being provided with inwardly extending portion 54 to rest between two adjacent teeth.

Figure 3:
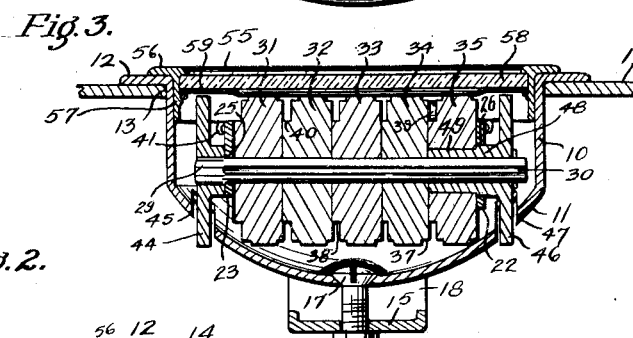
Figure 3 is a sectional view taken longitudinally with the center of the numeral bearing wheels.

It will be seen that all of the registering mechanism may be mounted in the frame 19 and secured in position, after which the said frame may be placed in the shell and the lugs 28 forced into the notches 24 without any rivets or screws. The open end of the shell 10 is provided with a crystal supporting frame 55 having a flange 56 to rest over the flange 12, and an inwardly projecting annular flange 57 to extend into the said shell, as clearly shown in Figure 3. The flange 57 is designed to carry a crystal 58 and a plate 59, said plate being provided with a slot 60 through which the characters of the numeral wheels may be seen. The slot is of such width that only the desired characters may be visible. The outer face of the plate 59 may also be used for carrying suitable advertisements, if so desired.

Thus it will be seen that I have provided a mileage indicator of simple, durable and inexpensive construction, especially designed to indicate the number of miles traveled by an automobile at a definite time, such as when the automobile has been filled with oil or gasoline, and which serves as a reminder to the operator that when the odometer indicates the same as the mileage register, it is time to have the oil changed, and has the advantage of being easy and simple to install, and when installed has the general appearance of the trimmings of the dash, such as the oil gauge, etc.

I claim as my invention:

1. A mileage indicator comprising a cylindrical casing having at one edge an annular flange and its opposite edge provided with a spherical bottom, a rectangular frame designed to rest on the said bottom and to fit the interior of said casing, the upper edge of the corners of said frame being provided with notches, said casing being provided with lugs to enter said notches, a shaft rotatively mounted in said frame, a series of numeral bearing wheels on said shaft, one of which is rigidly secured thereto, a hand wheel on one end of said shaft, said hand wheel having a portion extended through the said bottom member, one of said numeral bearing wheels being mounted on a sleeve rotatively mounted in said frame member and has its outer end provided with a second hand wheel having a portion extended through the bottom of said casing, a carrying mechanism for operatively connecting other ones of said numeral bearing wheels.

2. A mileage indicator comprising a cylindrical casing having at one edge an annular flange and its opposite edge provided with a spherical bottom, a rectangular frame designed to rest on the said bottom and to fit the interior of said casing, the upper edge of the corners of said frame being provided with notches, said casing being provided with lugs to enter said notches, a shaft rotatively mounted in said frame, a series of numeral bearing wheels on said shaft, one of which is rigidly secured thereto, a hand wheel on one end of said shaft, said hand wheel having a portion extended through the said bottom member, one of said numeral bearing wheels being mounted on a sleeve rotatively mounted in said frame member and has its outer end provided with a second hand wheel having a portion extended through the bottom of said casing, a carrying mechanism for operatively connecting other ones of said numeral bearing wheels, a crystal frame for the open end of said casing, a crystal and a crystal plate within said frame.

JESSE H. MATTHEWS.